W. ADAMSON.
APPARATUS FOR TREATING SUBSTANCES WITH HYDROCARBON.
No. 184,815. Patented Nov. 28, 1876.
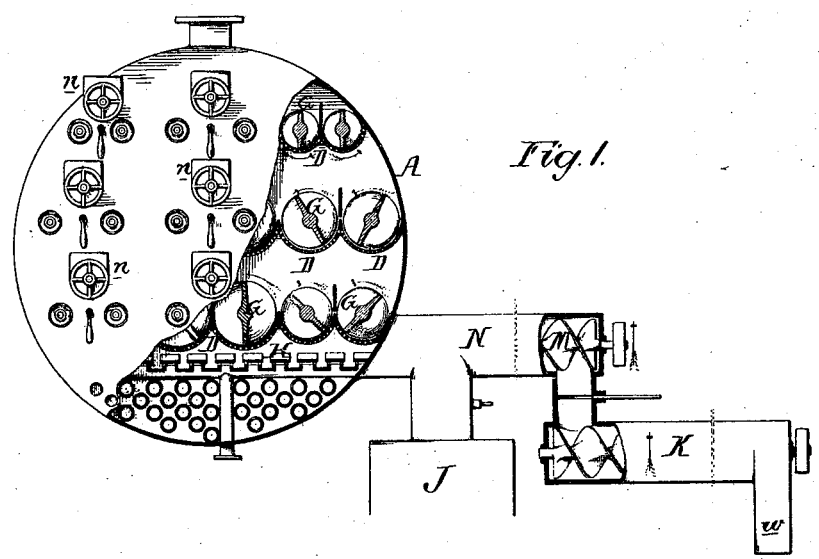
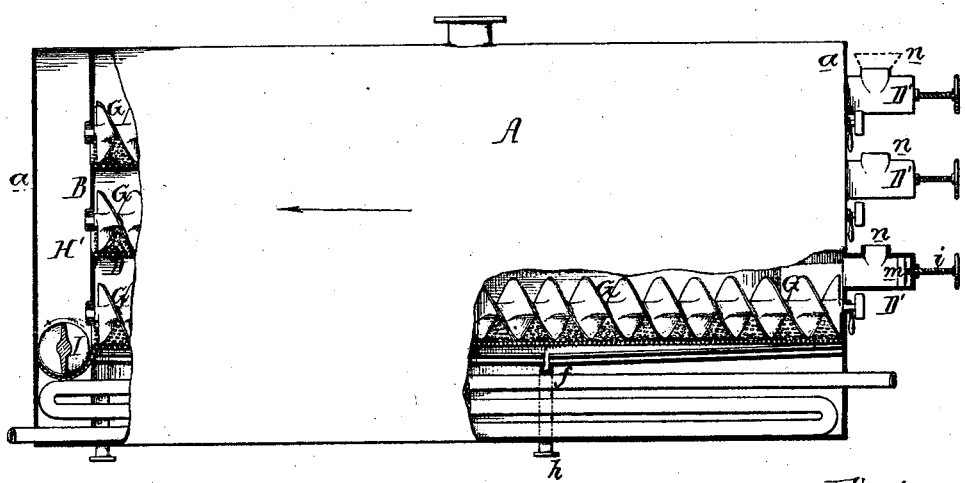
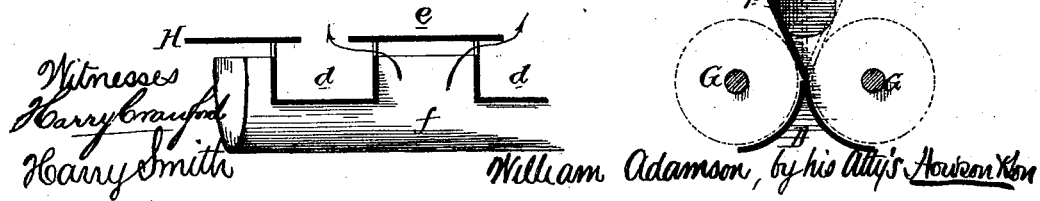

UNITED STATES PATENT OFFICE.

WILLIAM ADAMSON, OF PHILADELPHIA, PENNSYLVANIA.

IMPROVEMENT IN APPARATUS FOR TREATING SUBSTANCES WITH HYDROCARBON.

Specification forming part of Letters Patent No. 184,815, dated November 28, 1876; application filed October 2, 1876.

*To all whom it may concern:*

Be it known that I, WILLIAM ADAMSON, of Philadelphia, Pennsylvania, have invented certain Improvements in Apparatus for Treating Substances with Hydrocarbon, of which the following is a specification:

The object of my invention is to subject animal and vegetable substances, by a continuous process, to the action of hydrocarbon vapor, or to the combined action of liquid hydrocarbon and vapor, so as to insure the rapid extraction of fatty, oily, gummy, and resinous and other soluble matter, and the equally-rapid conversion of the insoluble matter into ingredients for manure and other purposes.

In the accompanying drawing, Figure 1 is an end view, partly in section, of my apparatus for the continuous hydrocarbon treatment of different substances; Fig. 2, a side view, partly in section; and Figs. 3 and 4, enlarged detached views, illustrating parts of the apparatus.

The vessel A, in which the operation is conducted, is, in the present instance, cylindrical, with flat ends $a$ and $a'$. From a partition, B, near the end $a$ of the vessel, to the opposite end $a'$, extend a series of semi-cylindrical perforated troughs, D, arranged in tiers—three, in the present case—the troughs of each tier being united to each other and to the sides of the vessel, so that each tier forms a perforated partition, extending across the interior of the said vessel. To each trough is adapted a screw or conveyer, G, one journal of which turns in a bearing in the partition B, and the other in a stuffing-box bearing in the end $a'$ of the vessel, on the outside of which the journal is furnished with a pulley for receiving a driving-belt, or any suitable gearing may be employed for so rotating the conveyers, that they will force the contents of the trough in the direction of the arrow. Beneath the lowest tier of troughs, and across the vessel, extends a partition, H, composed of a series of channels, $d$, (best observed in the enlarged view, Fig. 3,) the channels being arranged a short distance apart from each other, and above the openings between the channels are plates $e$, so arranged as to permit the vapor from below to pass upward in the direction of the arrows, the plates so overlapping the channels that particles of material falling from the troughs above cannot interfere with the passage of the vapor. The channels are inclined downward from both ends to a transverse channel, $f$, which communicates with an escape-pipe, $h$, the latter passing through the shell of the vessel A. On the end $a'$ of the vessel are arranged a series of feeders, D', each consisting of a casing, by preference of cylindrical form, closed at the outer end, through which passes a piston-rod, $i$, attached to a piston, $m$, in the interior of the feeder, to which the material is admitted through an inlet-opening, $n$. During the operation of the apparatus, the piston remains at the outer end of the feeder, which is so packed with the material to be treated that the vapor cannot escape at the inlet. By pushing the piston toward the vessel, however, the material may be forced from the feeder into one of the troughs.

There may be one feeder for each trough, but I prefer to arrange one feeder to supply two troughs, as shown in Fig. 4, a plate, $p$, being hinged at the junction of two troughs, so that it may be turned to one side or the other, and serve to direct the material to either trough.

In the space within the vessel below the channels $d$ is a coil of steam-pipes; and hydrocarbon, being introduced into this space, is vaporized by the heat of the coils. The vapor, ascending and passing through the spaces between the channels, and passing through the perforations of the troughs, permeates the whole interior of the said vessel; hence the material, as it is caused to traverse the troughs by the conveyers, is subjected to the direct action of the vapor, which extracts the oily, fatty, and other soluble matter, the latter falling into the channels $d$, flowing down the latter into the transverse channel $f$, and thence through the discharge-pipe $h$ into any suitable receptacle.

The material from which the fatty and oily matter has been thus extracted is discharged through openings in the partition B into the chamber H', between the said partition and the end $a$ of the vessel, and is lodged in a transverse trough, I, communicating with an external pipe, N, and containing a screw-conveyer, M, the material being directed either into a storage-chamber, J, or being caused to traverse a second pipe, K, from which it may be discharged through a spout, w, into a bag or other receptacle, preparatory to being used as a manure, or manure ingredient, or applied to other purposes, the material being parched and dry and ready for use.

If desired, the hydrocarbon vapor may be generated in a separate vessel, and introduced into the vessel A, and after the vapor has performed its extracting duties, it may be carried off through a pipe, $x$, and may be condensed and washed, preparatory to being revaporized and reused.

The hydrocarbon may be introduced into the vessel from above, so as to percolate through the material, the liquid being vaporized before it reaches the bottom of the vessel by the steam-heated coil, so that the material in its course along the troughs is subjected to the combined action of a downward current of liquid hydrocarbon and upward currents of hydrocarbon vapor.

I claim as my invention—

1. In a vessel for treating substances with hydrocarbon vapor, a series of perforated troughs, along which the substance is caused to traverse while subjected to the action of the vapor, all substantially as set forth.

2. The combination, in the vessel A, of a series of perforated troughs, D, with rotating screw-conveyers, adapted to the said troughs, as set forth.

3. The combination, in the vessel A, of the perforated troughs, with channels $d$, inclined downward toward a discharge pipe or pipes, $h$, as specified.

4. The combination, in the vessel A, of the system of perforated troughs, the partition B, the transverse trough I and its conveyer, and the pipe N.

In testimony whereof I have signed my name to this specification in the presence of two subscribing witnesses.

WILLIAM ADAMSON.

Witnesses:
HERMANN MOESSNER,
HARRY SMITH.